April 21, 1970   S. SAROVICH ET AL   3,507,380
CONVEYOR WITH WOOD CABLE GUIDE
Filed Jan. 24, 1968   2 Sheets-Sheet 2

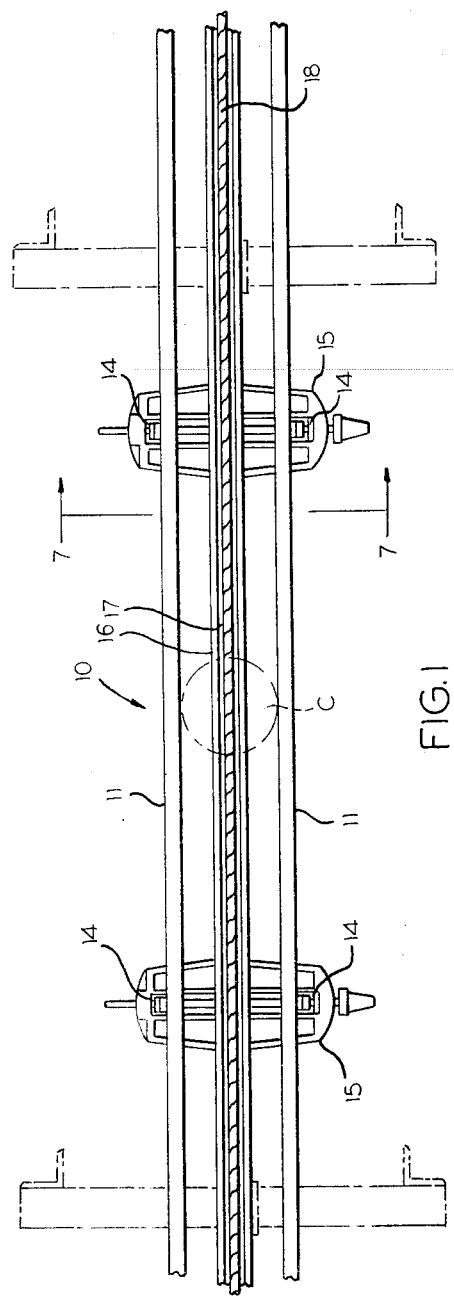
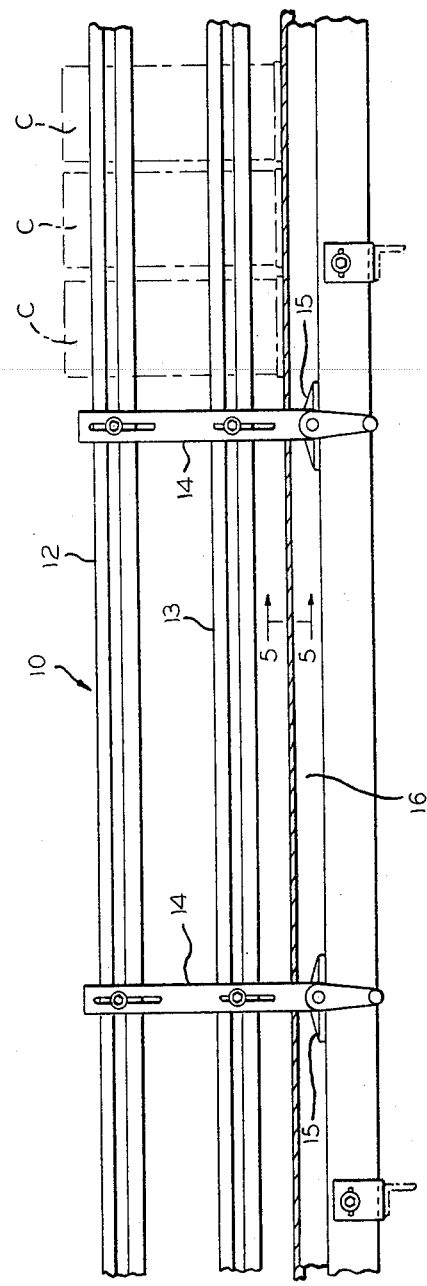

INVENTORS
STEVE SAROVICH
THEODORE J. BABUREK
BY Mullin & Siegel
ATTORNEY

United States Patent Office 3,507,380
Patented Apr. 21, 1970

3,507,380
CONVEYOR WITH WOOD CABLE GUIDE
Steve Sarovich, Oak Forest, and Theodore J. Baburek, Oak Lawn, Ill., assignors to Sardee Corporation, Chicago Ridge, Ill., a corporation of Illinois
Filed Jan. 24, 1968, Ser. No. 700,178
Int. Cl. B65g 19/22
U.S. Cl. 198—130                                   8 Claims

ABSTRACT OF THE DISCLOSURE

An article conveyor has a driven cable supported by, and movable in, a continuous groove formed in a wooden lubricant-impregnated guide track, the diameter of the cable being slightly larger than the depth of the groove so that a portion of the cable protrudes above the top of the track. The conveyor is provided with side rails for supporting the article as it is moved along by the cable upon which said article rests.

BACKGROUND OF THE INVENTION

This invention relates generally to article conveyors of the type used to transport articles such as filled or unfilled cans in a horizontal or slightly inclined plane within, for example, a factory or cannery. More particular, the invention relates to improvements in cable-type conveyors in which the articles are moved by a driven cable upon which the article rests. Specifically, the invention pertains to such cable conveyors with wooden lubricant-impregnated cable guide and support means.

Heretofore, cable-type conveyors have comprised tracks consisting of one or a pair of side rails encompassing a cable mounted near the bottom thereof, said cable being supported and driven by a plurality of spaced-apart sheaves. The articles or cans were supported by the continuously moving cables. The cans were further supported usually in an upright position by the side rails.

Because the cable was not continuously supported but instead was supported only at the point of contact of the same with the sheaves, a somewhat unstable condition existed whch resulted in numerous objectionable features. Since the sheaves were spaced apart (20 to 40 inch centers), there was a certain amount of slack in the portions of the cables between the sheaves and this slack was of course communicated to the cams being transported thereon so that the path of travel of the cans between the sheaves dipped somewhat. Since cans are usually transported in close proximity one to the other, any such dip caused the cans to cant sufficiently towards each other so that the tops of the cans touched one another. The vibration set up in the cans during the transporting of the same caused them to clatter against each other thereby setting up a most objectionable noise. Likewise, depending upon the amount of vibration and the physical properties of the containers (for example, glass jars) damage and even breakage of the containers was sometimes experienced.

SUMMARY OF THE INVENTION

The article conveyor of the subject invention comprises a pair of side rails mounted one on each side of a cable guide track. The cable guide track comprises a continuous wooden track impregnated with a lubricant and having a central longitudinal continuous slot. Within this slot is positioned a cable which is driven to slide or move along said slot. The width of the slot is sufficiently greater than the diameter of the cable so that the cable moves freely in the slot. The depth of the slot is slightly less than the diameter of the cable so that a portion of the cable protrudes above the top of the track.

The articles such as containers, for example cans, are supported on the cable with the sides of the cans supported by the side rails of the conveyor.

Because of the continuous wooden cable guide support, the conveyor may be designed to change its course of travel as much as 180°. For this purpose, corner turns having grooves, the radius of which is selected in accordance with the amount of turn desired, i.e., 90°, 180°, are provided.

It is therefor an important object of this invention to provide a cable-type conveyor which will overcome all of the objections indicated hereinabove.

A primary object of this invention is to afford a cable conveyor in which the cable is continuously supported in a stable condition.

Another object of this invention is to provide a cable conveyor in which the volume of noise is maintained at an unobjectionable low level.

A further object is to provide a cable conveyor in which breakage or damage to the containers or objects being transported is sharply reduced from that heretofore prevalent in conveyors of this type.

Still another object is to afford a cable-type conveyor the cost of which is substantially less than standard cable conveyors, often as much as half that of prior conveyors of this type.

Yet another object of this invention is to afford a wooden lubricant-impregnated guide means which may be readily installed in cable conveyors having sheave-supported and driven cables thereby converting the same to the improved cable conveyor comprising the subject matter of the present invention.

Finally, an important object is to provide a cable conveyor system of relatively simple, inexpensive construction, yet durable and representing highly desirable improvements over prior cable conveyors.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

BRIEF DESCRIPTION OF THE DRAWINGS

For the purpose of facilitating an understanding of our invention, we have illustrated in the accompanying drawings a preferred embodiment thereof, from an inspection of which, when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a top plan view of a length of a cable conveyor embodying the principles of our invention;

FIG. 2 is a side elevational view of the same;

DESCRIPTION OF THE PREFERRED EMBODIMENT

Figure 3:
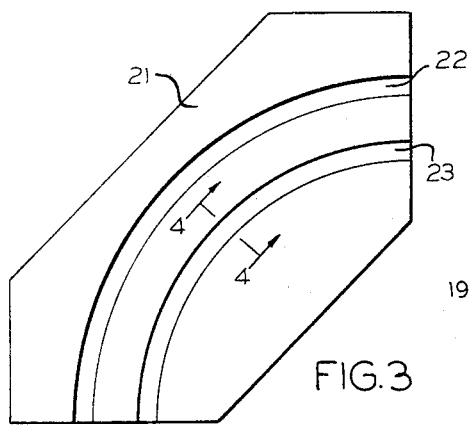
FIG. 3 is a top plan view of a 90° corner turn cable guide section.

Referring first to FIGS. 1 and 2 of the drawings, reference numeral 10 indicates generally a cable-type conveyor comprising a pair of side rails 11—11, each of said side rails comprising an upper channel 12 and a lower channel 13 supported in horizontal spaced relationship by upright bracket members 14. Each opposed pair of upright bracket members 14 protrude upwardly and are connected together by cable track support members such as 15 positioned in spaced relationship with, but below, the lower side rail channels 13.

Figure 6:
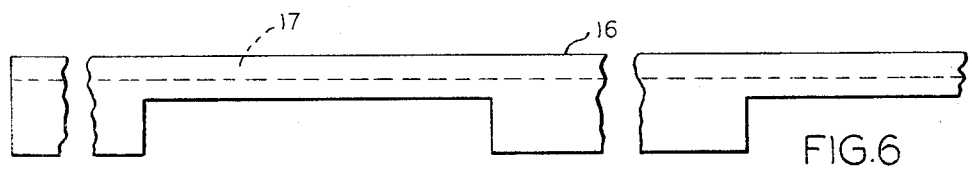
FIG. 6 is a fragmentary side elevational view of the wooden cable guide track.
Figure 5:
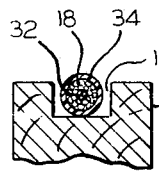
FIG. 5 is a fragmentary sectional view taken on the plan of line 5—5 in FIG. 2 of the drawings and viewed in the direction indicated.
Figure 4:
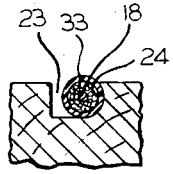
FIG. 4 is a fragmentary sectional view taken on the plane of line 4—4 in FIG. 3 of the drawings and viewed in the direction indicated.
Figure 7:
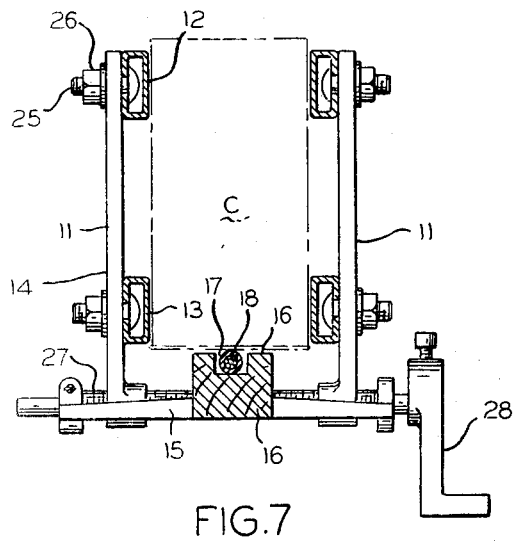
FIG. 7 is a partially sectional view taken on the plane of line 7—7 in FIG. 1 of the drawings and viewed in the direction indicated.

A cable guide track member 16 is positoned approximately midway between side rails 11 and is supported by the support members 15. As shown in FIGS. 5, 6 and 7 of the drawings, the cable guide track member 16 comprises a length of lubricant-impregnated wood such as is marketed by the Arguto Oilless Bearing Company of Philadelphia under the trademark "Arguto" and is formed with one or more cable guide grooves 17 extending longitudinally the length of the track. The groove is dimensioned to accommodate in readily sliding movable relationship a conveyor cable such as 18, the structure and function of which will become apparent as the description proceeds.

The depth of the groove 17 is slightly less than the diameter of the cable 18 as may be readily noted in FIG. 5 of the drawings. Thus a portion of the cable protrudes above the top of the track 16 so that articles such as containers C (FIGS. 2 and 7 of the drawings) when supported on the cable 18 may be readily transported or moved along as the cable is driven or moved by any suitable conventional drive means (not shown).

Figure 9:
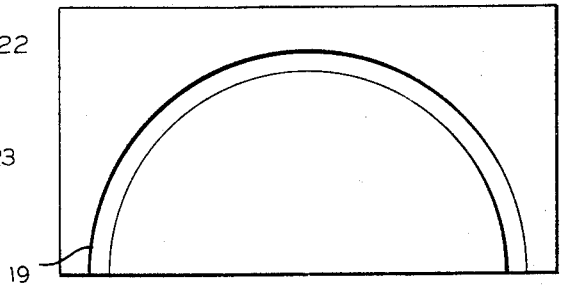
FIG. 9 is a top plan view of a portion of a conveyor system with a 180° corner turn.

When it is desired to change direction of the conveyor as for example, to make as much as a 180° turn, a corner turn member or wood slab such as 19 (see FIG. 9) is provided with a groove 20 of semicircular shape having the ends thereof aligned with the ends of the grooves 17 in the side conveyor members 10. In FIG. 3 of the drawings, a 90° corner turn member 21 is provided having a pair of grooves 22 and 23 for use in cable systems having double or multiple cables. In either case, however, it may be preferable to form the inner wall of the corner turn group 20, 22 or 23 as the case may be, in a concave shape adapted to more fully fit the convex wall of the cable 18. Such a groove exerts a more positive retaining action on the cable 18 especially as it is bent during its movement through the arcuate path of the corner turn groove. If desired, all of the grooves, including those in the side members 16, may be made with convex arcuate walls although we have found that at least in the side conveyor track guide members this is unnecessary.

Directing attention now to FIGS. 5 of the drawings, it will be noted that the channel members 12 and 13 may be removably mounted to the upright bracket members 14 by means of bolts 25 and nuts 26. The bracket members 14 may be mounted on screw threaded rods such as 27 so that the spacing between the side rails may be varied as desired. For this purpose, a handle 28 may be provided as shown in FIG. 7 of the drawings.

Referring now to FIG. 6 of the drawings, it will be noted that the cable guide track member 16 is formed with cutout portions 29 in spaced relationship along the length thereof. These cutout portions 29 are dimensioned and provided so that they may accommodate therein the cable track support members 15 when said track members are laid thereover.

Figure 8:
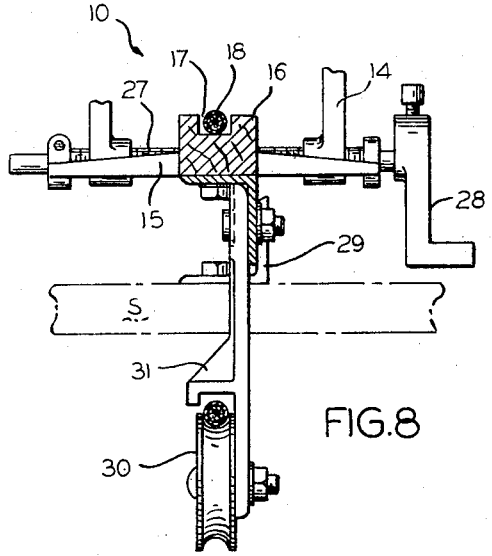
FIG. 8 is a sectional view similar to FIG. 7 but showing only the lower portion of the structure illustrated in FIG. 7 together with a sheave cable return means therebelow.

In those conveyor systems in which articles are conveyed in straight directions, the return means for the cable may be of any conventional type as shown in FIG. 8 of the drawings. In this case, the cable conveyor 10 is mounted by means of suitable support brackets such as 29 to a support surface such as S with the return cable means comprising a sheave 30 depending therebelow by means of a return cable bracket assembly 31.

The cable 18 may be of suitable construction but in the embodiment chosen for illustration comprises a nylon center core 32 surrounded by strands of steel 33 encased in a tube of nylon 34. Such a cable construction minimizes the friction but obviously any cable even without the nylon casing may be used. Actually, the lubricant impregnated in the wood is sufficient to minimize the friction as the cable moves within the groove sufficiently so that conveying is accomplished with practically the same or little more power than that required for ordinary sheave-type cable systems.

From the foregoing description and drawings, it should be apparent that we have provided an improved cable-type conveyor in which the cable of the conveying system is positively and continuously fully supported throughout the system so that there is no slack in the cable, the cable is moved in a straight level path with consequent similar movement of the containers or articles being conveyed in the system. As indicated previously, such positive fully supported conveying materially reduces the noise level and damage to the containers in the conveyors. The overall cost of the conveying system may be reduced as much as fifty percent (50%).

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention.

What we claim and desire to secure by Letters Patent of the United States is:

1. In a cable-type conveyor system having at least one side rail and a driven cable positioned in operational relationship with said side rail whereby articles are supported on and transported by said cable, the herein improvement comprising;

at least one length of wooden track substantially coextensive with said conveyor system, said track having a longitudinal groove opening to the top surface thereof and having a lubricant therein, said cable being disposed in sliding relationship within said groove so as to be continuously supported by said track, the depth of said track being less than the diameter of said cable to permit the articles to rest upon said cable and to be transported thereby.

2. The conveyor system of claim 1 in which: said track comprises a length of lubricant-impregnated "Arguto" wood.

3. The conveyor system of claim 1 in which; said groove is rectangular shaped and the width thereof is greater than the diameter of said cable.

4. The conveyor system of claim 1 in which; corner turns are provided for changing the direction of travel of said cable, said corner turns comprising pieces of "Arguto" wood with at least one arcuate groove formed in the top surface thereof, at least one end of said groove aligned with said longitudinal groove.

5. The conveyor system of claim 4 in which; the inner wall of the groove of said corner turn is concave and complementary with the adjacent portion of the surface of said cable.

6. The conveyor system of claim 1 in which; said side rails are two in number, each of said side rails comprise a pair of spaced apart channels supported by a plurality of pairs of upright bracket members, said bracket members connected by cable track support members and said track is supported by said last-mentioned members.

7. The conveyor system of claim 6 in which; a return cable assembly depends therefrom, said return cable assembly comprising a plurality of bracket assemblies and cable guide sheaves, one of said sheaves mounted in each bracket assembly and each of said bracket assemblies positioned in spaced apart relationship one with the other.

8. The conveyor system of claim 6, in which said side rails respectively have a threaded opening therein, and further comprising a threaded shaft threadably engaging said openings and having a handle thereon for rotation in one direction concurrently to move said side rails toward each other and for rotation in the other direction concurrently to move said side rails away from each other thereby to accommodate various sized articles.

References Cited

UNITED STATES PATENTS

| | | | |
|---|---|---|---|
| 3,121,490 | 2/1964 | Rainbow | 198—130 |
| 3,197,201 | 7/1965 | Craig | 198—190 XR |
| 3,289,818 | 12/1966 | Kittredge | 198—190 |
| 3,313,400 | 4/1967 | Johnson | 198—137 |

ROBERT G. SHERIDAN, Primary Examiner

U.S. Cl. X.R.

198—137